(12) United States Patent
Chang et al.

(10) Patent No.: US 6,640,250 B1
(45) Date of Patent: Oct. 28, 2003

(54) METHOD AND APPARATUS FOR PREVIEWING AND SELECTING A NETWORK RESOURCE USING A ROTARY KNOB FOR USER INPUT

(75) Inventors: Shu Kuen Chang, Chicago, IL (US); Ray Winninger, South Holland, IL (US); Michael Mills, San Francisco, CA (US)

(73) Assignee: 3Com Corporation, Santa Clara, CA (US)

( * ) Notice: Subject to any disclaimer, the term of this patent is extended or adjusted under 35 U.S.C. 154(b) by 534 days.

(21) Appl. No.: 09/583,835

(22) Filed: May 31, 2000

(51) Int. Cl.[7] ................................................ G06F 15/16

(52) U.S. Cl. ......................... 709/229; 709/203; 709/245

(58) Field of Search .................................. 709/203, 245, 709/229, 225, 226, 227, 228, 250; 345/738–39, 763–64, 783, 787, 810, 835, 838, 846, 853, 855

(56) References Cited

U.S. PATENT DOCUMENTS

| | | | |
|---|---|---|---|
| 4,666,973 A | * 5/1987 | Heinz et al. | 524/504 |
| 4,866,542 A | 9/1989 | Shimada et al. | 360/10.3 |
| 5,408,275 A | 4/1995 | Song et al. | 348/734 |
| 5,914,669 A | 6/1999 | Wicks et al. | 340/825.44 |
| 5,914,714 A | * 6/1999 | Brown | 345/866 |
| 5,973,666 A | 10/1999 | Challener et al. | 345/146 |
| 6,028,600 A | 2/2000 | Rosin et al. | 345/327 |
| 6,407,752 B1 | * 6/2002 | Harnett | 345/744 |

OTHER PUBLICATIONS

T. Berners–Lee, "*Universal Resource Identifiers in WWW—A Unifying Syntax for the Expression of Names and Addresses of Objects on the Network as used in the World–Wide Web*", Network Working Group, RFC 1630, Jun. 1994, pp. 1–28.

Berners–Lee et al, "*Hypertext Transfer Protocol—HTTP/ 1.0*", Network Working Group, RFC 1945, May 1996, pp. 1–60.

(List continued on next page.)

Primary Examiner—Mehmet B. Geckil
(74) Attorney, Agent, or Firm—McDonnell Boehnen Hulbert & Berghoff (57) ABSTRACT

Disclosed is an apparatus and method for selecting wide area network resources, such as resources identified by URL values, using a rotary knob for user input. A client device having a display and a rotary knob is used for accessing network resources via a public network using an application program, such as a browser application. Rotation of the knob is detected by the client device, which adjusts the contents of a previewing window according to the rotation of the knob. The previewing window identifies graphics corresponding to predefined network resources and the graphics are output in a preview area of the display on the client device. As the user rotates the knob, the graphics for the network resources in the preview window are scrolled through the preview area of the display under control of the knob. The preview area includes a selection frame for selecting a network resource. When a graphic corresponding to a desired network resource is positioned within the selection frame, then the user depresses the knob, or other selection input device, to select the desired network resource. A network resource identifier, such as a URL value, corresponding to the desired network resource, is then sent to the browser application for processing. The browser application transmits a command, such as an HTTP command, onto the public network, receives and processes a response to the HTTP command, and displays the information from the response on the display of the client device.

28 Claims, 10 Drawing Sheets

OTHER PUBLICATIONS

Naehyuck Chang, "*Quadrature Decoder*", pp. 1–9.

Lab Electronics, "*DR–002 Decoder Counter For Incremental Encoder*", pp. 1–2.

Agilent Technologies, "*Quadrature Decoder/Counter Interface ICs*", HCTL–2000, HCTL–2016, HCTL–2020, pp. 1–18.

"*Homework 4*", www.cim.mcgill.ca/~buehler/mechatronics/hw/b3hw4.htm, pp. 1–15.

CTS Corporation, "*16mm Rotary Encoder*", Series 288 Encoder Technical Data, pp. 1–4.

Alan Cooper, "*The Inmates Are Running The Asylum*", 1999, pp. 138–148.

* cited by examiner

METHOD AND APPARATUS FOR PREVIEWING AND SELECTING A NETWORK RESOURCE USING A ROTARY KNOB FOR USER INPUT

FIELD OF INVENTION

The present invention relates to internet communications and, more particularly, to user selection of a wide area network resource, such as a web site.

BACKGROUND OF THE INVENTION

The present invention is concerned with user selection of wide area network resources, such as a network resource identified by a Uniform Resource Locator (URL).

Users of computer systems have access to a vast amount of information through their network connections. The Internet, for example, is a wide area network that interconnects computer networks around the world and provides a user client device connected to the Internet with access to a broad array of resources connected to the Internet, i.e. access to servers that are also connected to the Internet. In order for information to be accessible to a wide number of client devices and servers, a body of software, a set of protocols and a set of defined conventions are generally needed that permit intercommunication. The World Wide Web is one example of such a body of software, set of protocols and set of defined conventions.

A user typically accesses the resources of the World Wide Web through the use of a browser application program. A browser typically executes on a client device connected to Internet. The user enters a resource identifier value that identifies a desired web resource through a command input line of the user interface of the browser. The resource identifier value is typically a Uniform Resource Identifier (URI) or a Uniform Resource Locator (URL) that is resolved into an address for a server device having the desired object. See Request for Comment (RFC) 1630 available through the Internet Engineering Task Force at URL www.ietf.org.

When a URL value has been input to the browser, the browser transmits a command containing the URL value. The command is typically formatted according to a Hypertext Transfer Protocol (HTTP) that provides a convention for commands and replies over the web. The URL value in the command is typically resolved to an address for a server connected to the web and to a resource on the server, such as a document. See RFC 1945. The server that receives the command will typically respond with an HTTP reply message containing information. This information is typically in the form of a document that uses the Hypertext Mark-up Language (HTML).

When the client device receives the response from the server containing the HTML document, the browser will process the document according to the HTML standard and display the resulting page.

Figure 1:
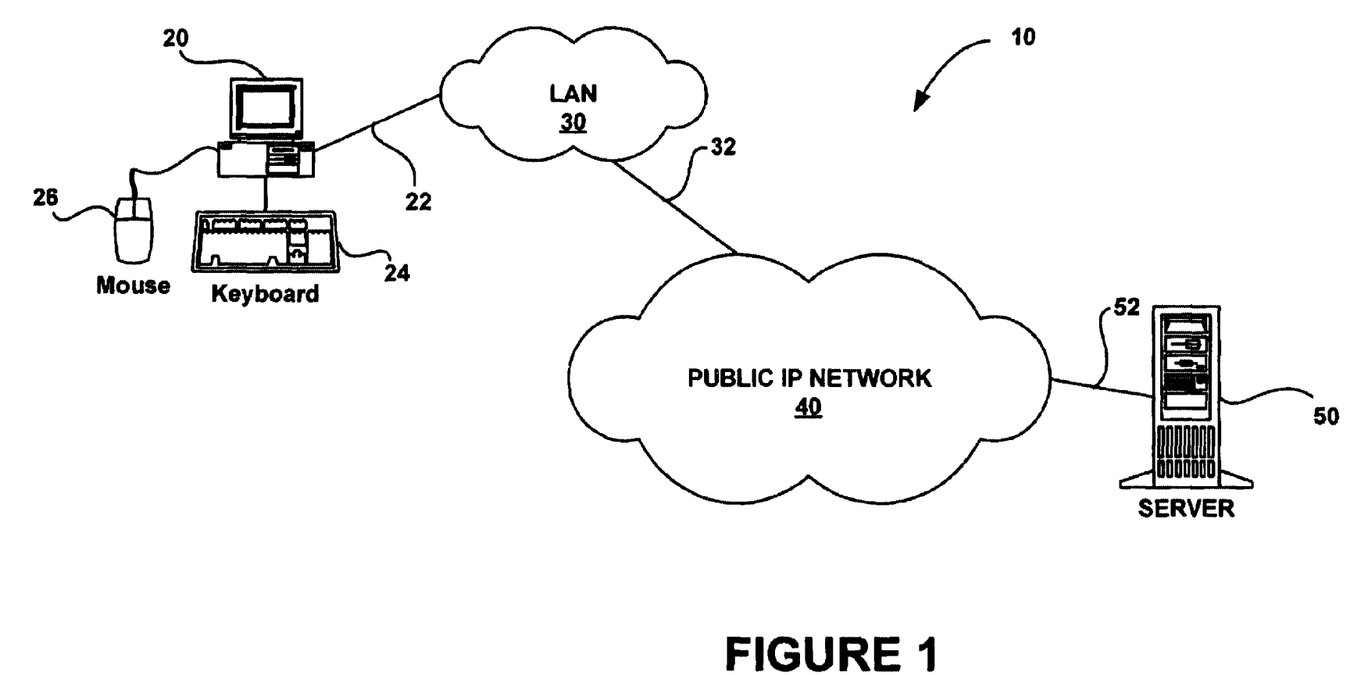
FIG. 1 is a functional block diagram illustrating an example of a conventional architecture for communication of a client device with a server through a public IP wide area network.

FIG. 1 is a functional block diagram illustrating an example of an architecture 10 involving a client device 20 and a server device 50 that can operate in the manner described above. Client device includes a keyboard 24 and a mouse 26 as user input devices. Client 20 is connected to a local area network (LAN) 30 via communication link 22. LAN 30 is connected to a public Internet Protocol (IP) network 40, i.e. a wide area network, that provides access to a broad range of network resources including those of server 50, which is connected to public IP network 40 via communication link 52. A browser application residing in client device 20 is controlled by a user through a combination of command inputs via mouse 26 in concert with keyboard 24.

While the use and operation of browser applications is generally well understood by those relatively skilled in the use of computers, the browser user interface may appear confusingly complex to less adept or less patient users. Access to a particular resource typically requires advance knowledge of the exact URL value corresponding to the resource. Also, URL values themselves can become rather complex and a spelling or formatting error in a URL value will generally result in a failure to access the desired resource. Therefore, the need remains for a simplified user interface that allows for the selection of wide area network resources.

SUMMARY OF THE INVENTION

In accordance with preferred embodiments of the present invention, some of the problems associated with selecting a network resource in the prior art are overcome.

An embodiment of a client system, according to the present invention, for accessing wide area network resources has a display with a viewing area and a previewing area, where the previewing area includes a selection frame. A user selection knob of the client system is configured to generate a clock signal and a data signal, where the clock signal indicates that the knob is being rotated and the data signal indicates a direction of rotation of the knob. The system includes a selection switch configured to generate a selection signal. The system also includes a memory subsystem configured to store a predetermined hierarchy of network resources, where the hierarchy of network resources includes a plurality of network resource identifier pairs. Each one of the plurality of network resource identifier pairs further includes a network resource identifier value corresponding to a network resource accessible via a wide area network and a graphic representing the network resource. The system further includes a network access circuit configured to communicate with the wide area network. A processor system of the client system is coupled to the display, the user selection knob, the selection switch, the memory subsystem, and the network access circuit. The processor system is configured to receive and decode the clock signal and the data signal in order to control a data index that selectively indexes one of the plurality of network resource identifier pairs. The processor system is further configured to display the graphic from the network resource identifier pair indicated by the data index in the selection frame of the display. Responsive to receiving the selection signal, the processor system is also configured to format a command that includes the network resource identifier value of the network resource identifier pair indicated by the data index and transmit the command onto the wide area network via the network access circuit.

An embodiment of a method for selecting network resources on a wide area network, according to the present invention, involves storing a hierarchy of the network resources accessible via the wide area network. The hierarchy of network resources includes a plurality of network resource identifier pairs, where each one of the plurality of network resource identifier pairs further includes a network resource identifier value corresponding to a network resource accessible via the wide area network and a graphic representing the network resource. The method calls for rotating a user selection knob to control a data index to the hierarchy of network resources, where the data index indicates one of the plurality of network resource identifier pairs. The method also calls for displaying in a selection frame the graphic from the network resource identifier pair indicated by the data index and selecting the network resource indicated by the data index. The method further sets forth accessing the selected network resource using the network resource identifier value from the network resource identifier pair indicated by the data index.

Another embodiment of a method, according to the present invention, for selection of input to a browser application involves providing a hierarchy of network resources, each network resource having a network resource identifier value and a graphic and rotating a knob to control a subset of network resources within the preview window from the hierarchy of network resources. The method further involves providing a preview area on a display and displaying the graphics corresponding to the network resources within the preview window. The method also sets forth selecting a graphic displayed within the preview area and inputting the user resource identifier value corresponding to the selected graphic to the browser application.

The foregoing and other features and advantages of the present invention will be more readily apparent from the following detailed description of an embodiment of the present invention, which proceeds with references to the accompanying drawings.

BRIEF DESCRIPTION OF THE DRAWINGS

Particular embodiments of the present invention are described below with reference to the following drawings, wherein.

Note that elements that are related to one another in the drawings are identified using the same or similar reference numbers.

DETAILED DESCRIPTION OF PREFERRED EMBODIMENTS

Figure 2:
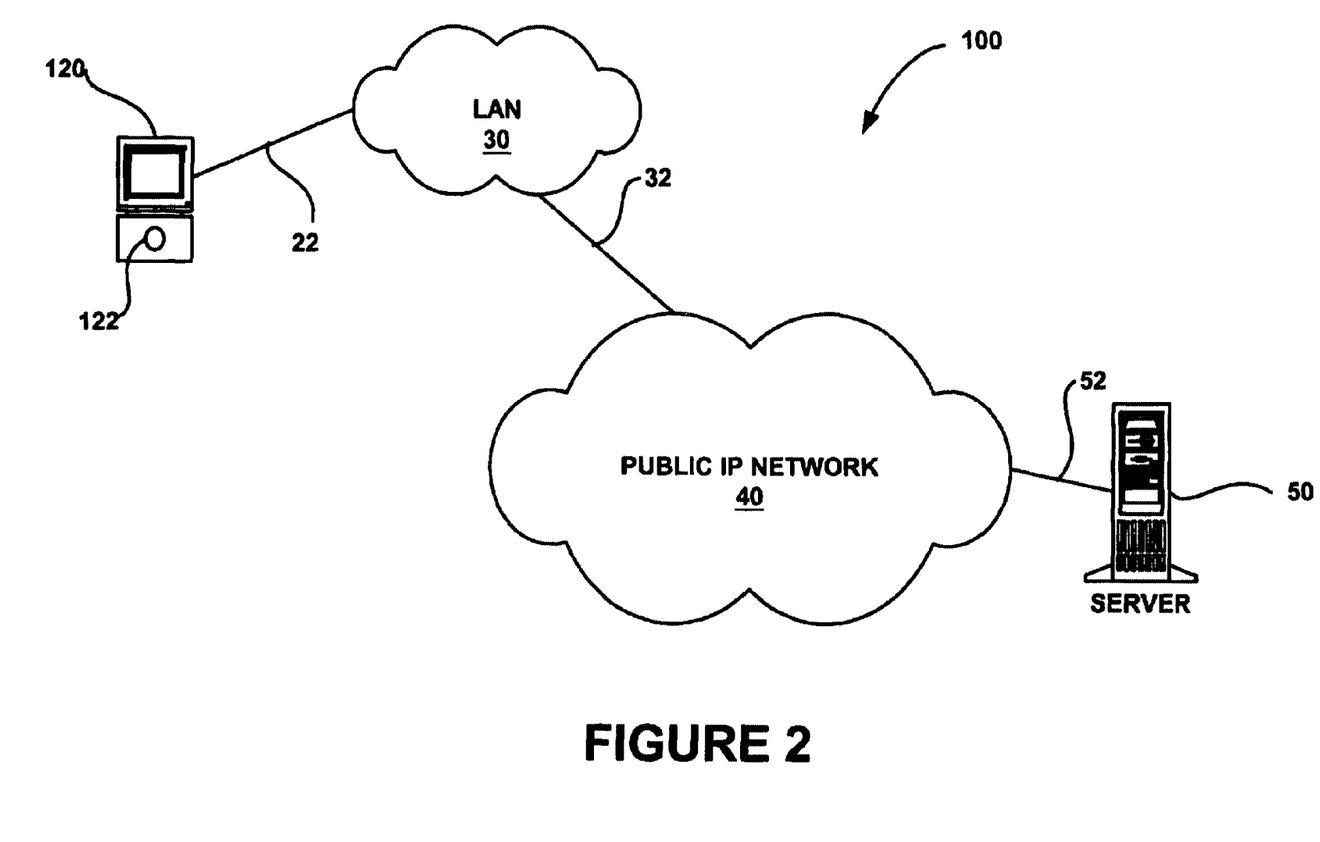
FIG. 2 is a functional block diagram illustrating an embodiment of an architecture that includes a client device according to the present invention.

The present invention is directed toward an apparatus and method for user selection of wide area network resources. FIG. 2 is a functional block diagram illustrating an exemplary architecture 100 that includes an embodiment of a client device 120 according to the present invention. The client device is connected to LAN 30 via communication connection 22. Client device 120 includes a user input knob 122 for selecting network resources accessible through public IP network 40, such as those residing on server 50.

Figure 3:
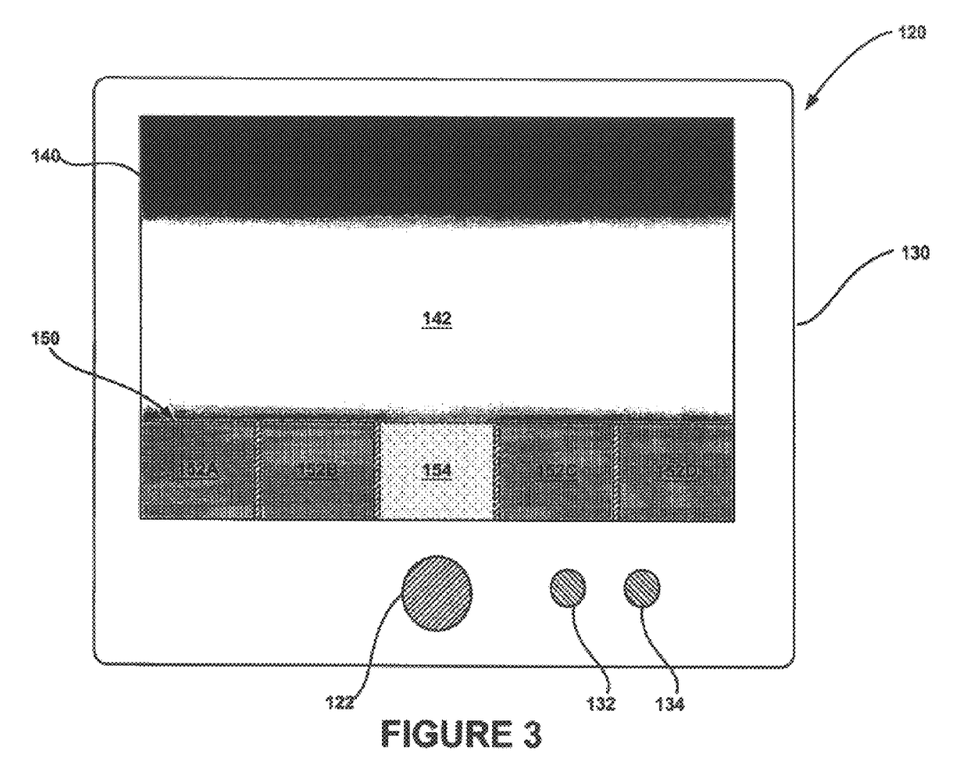
FIG. 3 is a diagram illustrating a front view of an embodiment of the client device, according to the present invention, shown in FIG. 2.

FIG. 3 is a frontal view of an embodiment of client device 120. Client device 120 includes a housing 130 that houses the user input knob 122, input buttons 132 and 134, which are optional, and a display 140. Display 140 is a graphical display device, such as a digital liquid crystal display (LCD), that includes a viewing area 142 in which is displayed an output page for a currently selected network resource or, at initialization, a default page.

Display 140 also includes a previewing area 150 that includes previewing frames 152A-D and selection frame 154. Previewing frames 152A-D and selection frame 154 display graphical images representing network resources accessible through a wide area network within a predetermined previewing window. In the embodiment shown in FIG. 3, the previewing window consists of five frames. Selection frame 154 corresponds to a network resource at the center of previewing window. Previewing frames 152A and 152B represent network resources preceding the network resource at the center of the previewing window in a predefined hierarchy of network resources that may be selected. Similarly, previewing frames 152C and 152D represent network resources following the network resource at the center of the previewing window in the predefined hierarchy of network resources that may be selected.

An embodiment of user input knob 122 includes a rotary encoder device that outputs a clock signal and a data signal that indicate rotational motion of the knob. The rotary encoder device may include a selection switch for generating a selection signal in response to a user depresses a shaft of the rotary encoder. As selection knob 122 is rotated, the network resource at the center of the previewing window changes, with the center of the previewing window moving up or down the hierarchy of network resources depending upon the direction of rotation. As the center of the previewing window is changed, graphical images corresponding to the network resources are scrolled through the previewing frames 152A-D and the selection frame 154. Thus, as the knob is rotated and the network resources within the previewing window change, the graphical images displayed within previewing area 150 change correspondingly so as to scroll the graphical images through the previewing frames 152A-D and the selection frame 154. This is reflected in process flow diagram 200 of FIG. 4 as step 202, wherein the user rotates the user input knob in order to preview graphical representations of the network resource options in the hierarchy.

In order to select a network resource, at step 204, the user rotates selection knob 122 to scroll graphical images until the graphical image corresponding to a desired network resource is displayed in selection frame 154. Then, at step 206, the user depresses knob 122 in order to select the desired network resource. At step 208, a network resource identifier, such as a URL value, corresponding to the network resource at the center of the previewing window is sent to a browser application executing within client device 120. At step 210, the browser application formats an HTTP command that includes the selected URL value and transmits the HTTP command into IP network 40 via LAN 30. As is understood by those of ordinary skill in the art, the URL value is resolved into a network address, such as the public IP network address of server 50, and the HTTP command containing the selected URL value is routed, at step 212, to the network address corresponding to the URL value. At step 214, based upon the HTTP command, server 50 will format a response, such as a Hyper Text Markup Language (HTML) document, and return the response to the browser application in client device 120. The browser will then process the response from server 50, at step 216, and display the information, e.g. a web page, from the response in the display area 142 in a manner similar to conventional browser applications. Previewing area 150 may be brought up and removed from display 140 under the control of input button 134 in order to make available the entire viewable area of display 140 for display of the information from the response.

Figure 5:
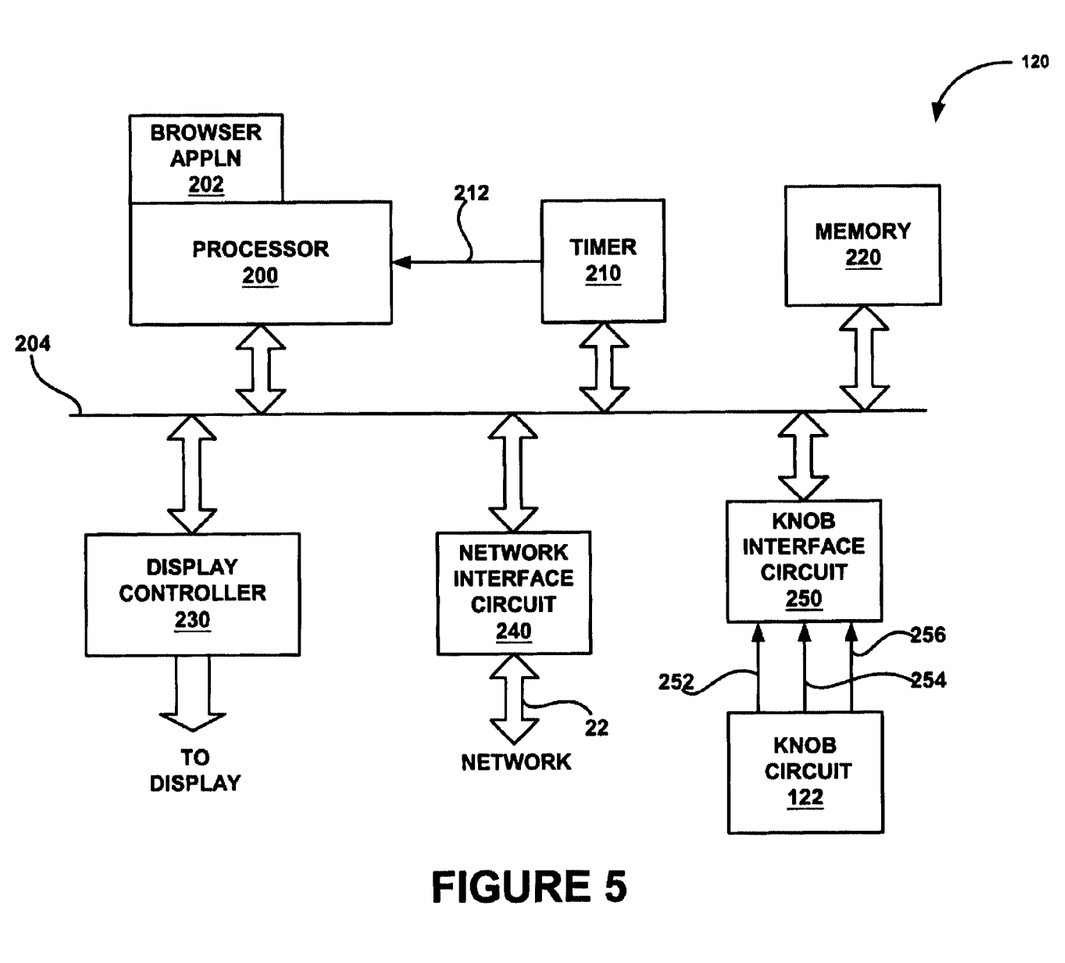
FIG. 5 is a functional block diagram illustrating one embodiment of the client device shown in FIGS. 2 and 3.

FIG. 5 is a functional block diagram illustrating one embodiment of a processor system of the client device 120 shown in FIGS. 2 and 3, where the processor system is configured to receive user input via the user input knob 122 and display information to the user via display 140. The embodiment of a processor system shown in FIG. 5 includes a processor 200 that is coupled to various peripheral devices through processor bus 204. The peripheral devices coupled to processor 200 include a programmable timer 210, a memory subsystem 220, a display controller 230, a network interface circuit 240, and a knob interface circuit 250.

Programmable timer 210 is programmed with a time-out value by processor 200 and, when the time-out value is reached, generates an interrupt signal 212 that is input to the processor. Memory subsystem 220 stores data and executable code for processes running on processor 200, such as browser application 202. Display controller 230 drives a display device, such as the display 140 of client device 120 shown in FIG. 3, and receives display updates under the control of processor 200. A network interface circuit 240, such as a network interface card (NIC) or a modem, sends and receives data packets, such as the HTTP command and response discussed above, over network connection 22. Knob interface circuit 250 receives and decodes the user selection information that is input via knob circuit 122, as shown in FIGS. 2 and 3.

In the embodiment of FIG. 5, knob circuit 122 outputs three signals, a clock signal 252, and a data signal 254, and a selection signal 256. When the user rotates the knob, the clock signal 252 will transition between logic 0 and 1 states. When knob interface circuit 250 detects a transition in the clock signal, such as a falling edge, then it checks the value of the data signal 254. If the data signal is a logic 1, then the knob has been rotated in one direction, and when the data signal is a logic 0, then the knob has been rotated in the opposite direction. By counting the number of clock pulses and sensing the data signal value, a count representing the position of the knob is maintained by knob interface circuit 250.

Figure 6:
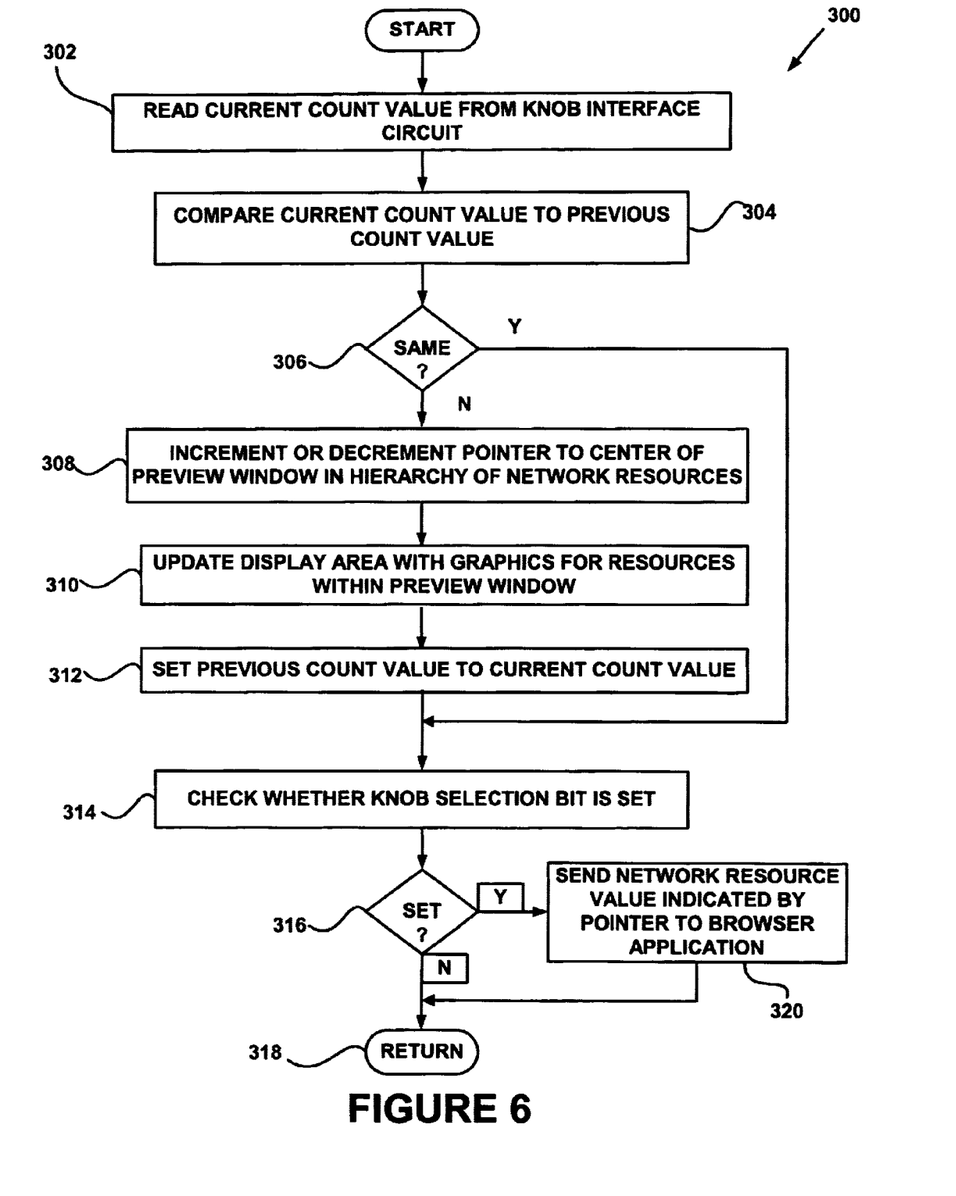
FIG. 6 is a control flow diagram that illustrates one embodiment of an interrupt routine, according to the present invention, based upon a polling approach to detecting changes in the position of knob of FIGS. 2 and 3.

FIG. 6 is a control flow diagram that illustrates one embodiment of an interrupt routine 300, according to the present invention, based upon a polling approach to detecting changes in the position of knob 122. Process 300 assumes that the system of client 120 has been initialized at power-up such that a data index, e.g. a data pointer, indexes or points to a default start value for the center of the selection window discussed above and the data index points to a portion of a data structure containing the predetermined hierarchy of network resources. This embodiment further assumes that the knob 122 is an incremental device, e.g. there is not an absolute relationship between the knob position and an output value of the knob circuit, and that a previous count value is initialized at start-up to the same value present in the counter within knob interface circuit 250.

When timer 210 times-out and interrupts processor 200, interrupt routine 300 is entered and the processor will read the current count value from the knob interface circuit 250 at step 302. At step 304, processor 200 compares the current count value to the previous count value. If the current count and previous count values are the same, then the knob has not been moved and control flow branches at step 306 to step 314.

If the current count and previous count values are not the same, then control flow branches at step 306 to step 308, where the point to the center of the preview window in the predetermined hierarchy of network resources is incremented or decremented according to the change in counter value. At step 310, processor 200 obtains the graphics corresponding to the network resources within the preview window and updates the graphics in the preview areas 152A-D and selection frame 154 of display 140, accordingly, which results in the graphics scrolling across the preview area 150. At step 312, the previous count value is set to the current count value to prepare for the next polling period and control flow continues to step 314.

At step 314, processor 200 checks whether the selection signal 256 is set. If signal 256 is not set, then control flow branches at step 316 to step 318, where processor 200 resets timer 210 and returns from interrupt routine 300. However, if signal 256 is set, then control flow branches to step 320, where the network resource value, such as a URL value, pointed to by the pointer to the hierarchy of network resources is sent to browser application 202, where the browser application processes the selection of the URL value. The register or flip-flop within knob interface circuit 250 that stores the selection signal 256 is then reset and control flow branches to step 318.

Figure 7:
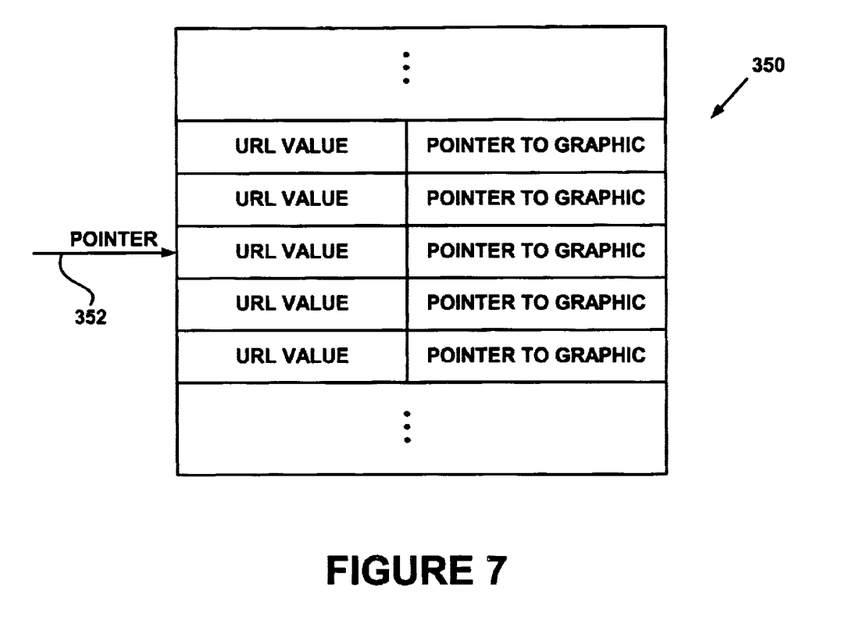
FIG. 7 is a data structure diagram illustrating an embodiment of a hierarchy of network resources utilized in the client device of FIGS. 2 and 3 and the process of FIG. 4.

FIG. 7 is a block diagram of an embodiment of a data structure 350 for the hierarchy of network resources according to the present invention. Data structure 350 is shown in FIG. 7 as a table containing multiple network resource identifier pairs of a URL value and a pointer to a graphic. The structure 350 can take on a variety of other forms, such as a linked list, as one of ordinary skill in the art will readily understand. Pointer 352 is the pointer to the center of the preview window and generally points to the network resource identifier pair for the network resource shown in the select area 154 of FIG. 3. The network resource identifier pairs stored in the data structure 350 for the hierarchy include a URL value for the network resource and a pointer to a graphic for the network resource. The graphic for the network resource identifier pair pointed to by pointer 352 is displayed in selection frame 154. The graphics for the other network resource identifier pairs within the preview window, i.e. the network resource identifier pairs that are adjacent to the network resource identifier pair currently indexed by pointer 352, are displayed in the preview windows 152A-D of FIG. 3. In the embodiment shown in FIG. 3, the preview window is plus and minus two pairs relative to pointer 352 for a total of five graphics displayed in preview area 150.

As selection knob 122 is rotated, the position of pointer 352 moves up or down the hierarchy depending upon the direction and magnitude of the knob rotation. As the preview window is changed by the knob rotation to include network resource identifier pairs not previously displayed, the pointer to the graphic in each new network resource identifier pair is used to retrieve the graphic for the network resource for output to the display 140 by processor 200. As the knob 122 is rotated clockwise or counterclockwise, the graphics for the network resources within the preview window are scrolled forwards or backwards, respectively, through the preview area 150. When the selection signal 256 is activated by depressing the knob 122, then the URL value from the network resource identifier pair indexed by pointer 352 is retrieved and output to the browser application 202. Data structure 350 resides in memory subsystem 220, which preferably includes persistent memory elements, such as flash memory, for storing the hierarchy. Likewise, the graphics for the network resources may also be stored in persistent memory elements within memory subsystem 220.

The network resource identifier pairs within data structure 350 may be predetermined by a manufacturer of the client device 120, defined by the user of client device 120, or both. A user interface application may be included that allows a user to update the contents of data structure 350. Alternatively, browser application 202 may be used to access a particular network resource that provides for the request and download of a new network resource identifier pair, including a URL and a graphic representing the new network resource in the data structure.

By using an incremental rotary encoder device for user selection knob 122, the number of selections available to the user is not limited by the number of positions of the knob 122. Consequently, the number of selections available to the user is determined by the number of network resource identifier pairs provided for by data structure 350. Thus, the amount of available memory substantially determines the number of selections available to the user.

Figure 4:
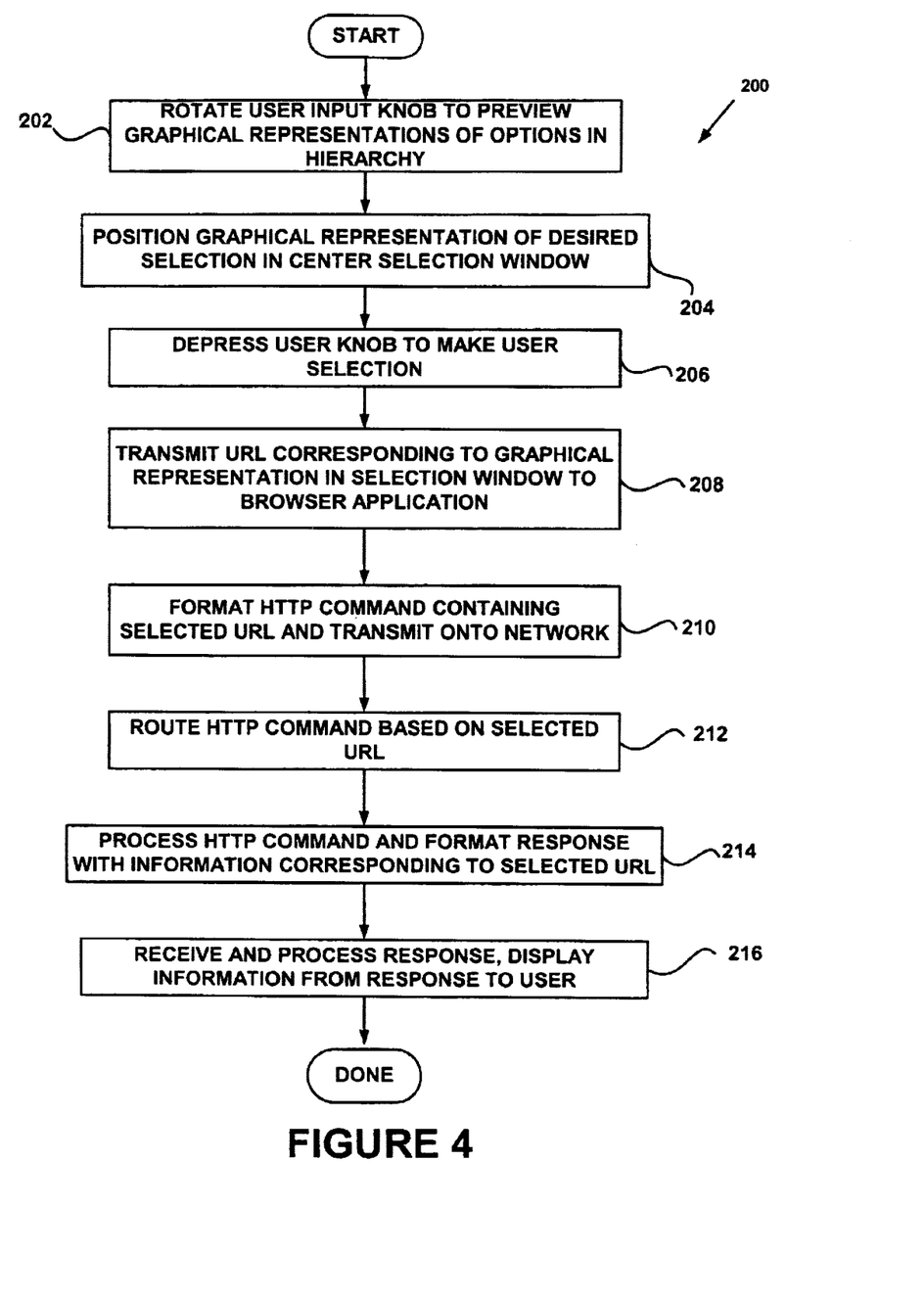
FIG. 4 is a control flow diagram illustrating an embodiment of a user input process performed with the client device shown in FIGS. 2 and 3.
Figure 8:
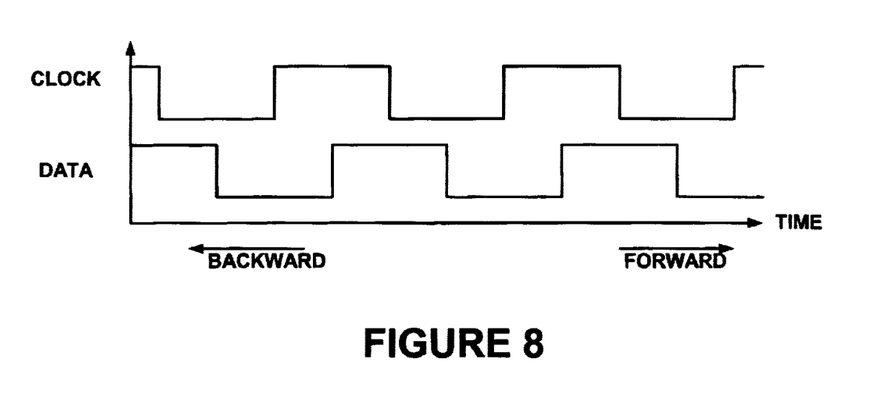
FIG. 8 is a waveform diagram illustrating an example of the output signal from the knob of FIG. 5.

FIG. 8 is a timing diagram illustrating the waveforms for the clock signal 252 and data signal 254 of FIG. 4 when the user selection knob 122 is rotated forward and backward. The clock and data signals may also be referred to as quadrature signals and one embodiment of the knob interface circuit 250 is a quadrature decoder circuit. When knob 122 is rotated forward, e.g. in a clockwise direction, the phase of the clock signal 252 leads the phase of the data signal 254 and the data signal is in a logic zero state at the rising edge of the clock signal. When knob 122 is rotated backwards, e.g. counter-clockwise, then the phase of the data signal 254 leads the phase of the clock signal and the data signal is in a logic one state at the rising edge of the clock signal.

Figure 9:
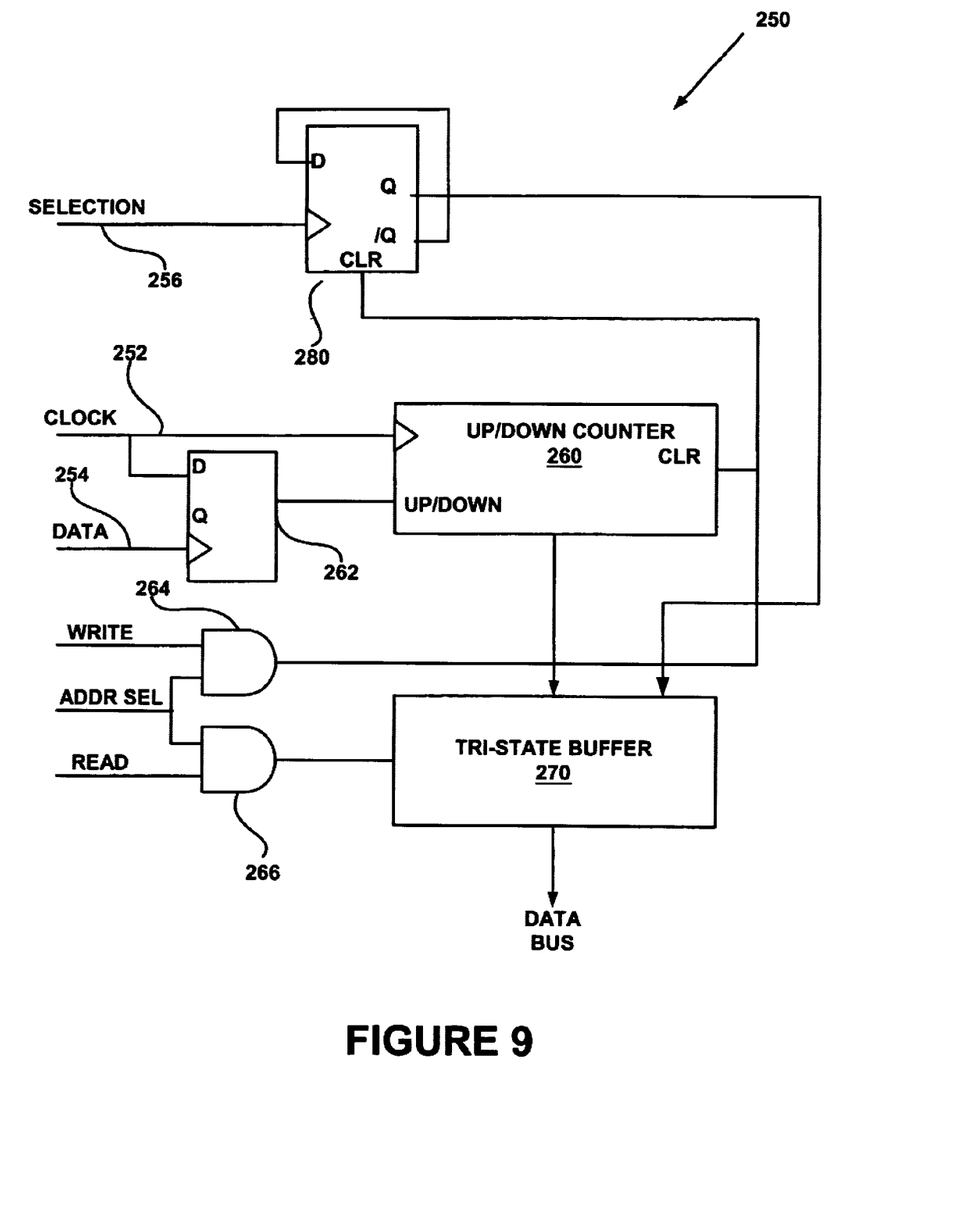
FIG. 9 is a functional block diagram illustrating one embodiment of the knob interface circuitry of FIG. 5.

FIG. 9 illustrates one embodiment of the knob interface circuit 250. Knob interface circuit 250 includes an up/down counter 260 that keeps a count that corresponds to the rotations of knob 122. Clock signal 254 drives a clock input of counter 260. D flip-flop 262 has an input that is driven by clock signal 254 and a clock input driven by data signal 256. Thus, D flip-flop 262 will latch the logic value of clock signal 254 at the rising edge of data signal 256 and output this value at a Q terminal that drives an up/down control of counter 260. The output of counter 260 is latched into tri-state buffer 270 for output onto a data bus that is part of processor bus 204 of FIG. 5.

Another D flip-flop 280 is driven by selection signal 256 applied to its clock input. An inverting output of flip-flop 280 is connected to an input of flip-flop 280. Thus, a rising edge of selection signal 256 will set a non-inverting output of flip-flop 280 to logic one. The non-inverting output of flip-flop 280 is input to tri-state buffer 270 so that it can be read via the data bus.

In order to read the count of counter 260 and the state of flip-flop 280, an address selection signal, which is derived from the bits of an address bus portion of processor bus 204 and corresponds to an address for the knob interface circuit 250, is combined with a read signal, which is part of a control bus that is part of processor bus 204, in AND gate 266 to generate an enable signal that is input to a control terminal of tri-state buffer 270. When the address signal and the read signal are both active, then the enable signal is active and the counter value of counter 260 and the state of flip-flop 280 are output onto the data bus portion of processor bus 204.

Once these values are read by processor 200 via bus 204, then the counter and flip-flop 280 must be cleared. AND gate 264 combines a write signal, which is part of a control bus that is part of processor bus 204, and the address select signal to generate a clear signal that drives clear terminals on both the counter 260 and flip-flop 280. Once cleared, the counter 260 is prepared to capture further rotation of the knob 122 and flip-flop 280 is prepared to capture the next user selection when knob 122 is depressed.

Figure 10:
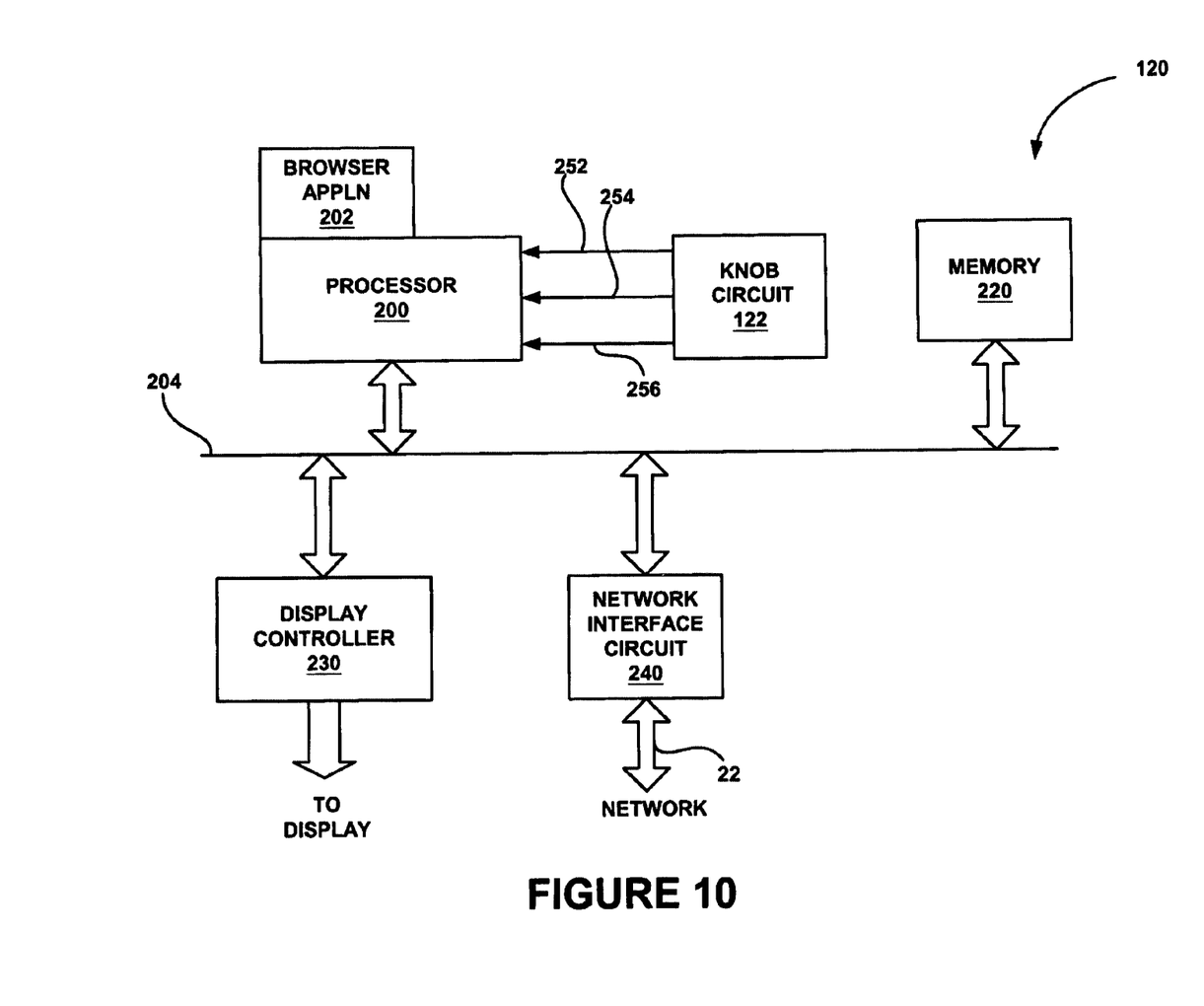
FIG. 10 is a functional block diagram illustrating another embodiment of the client device shown in FIGS. 2 and 3.

While the architecture of FIG. 5, the process of FIG. 6, and the circuit of FIG. 9 are configured to monitor user manipulation of knob 122 by periodically polling the knob interface circuit 250, an interrupt driven approach may also be employed. In FIG. 10, an architecture is shown whereby the processor 200 directly monitors user input via knob 122 through the use of the processor's interrupt scheme. In FIG. 10, clock signal 252 is coupled to a first interrupt input of processor 200, such as a non-maskable interrupt (NMI) input and selection signal 256 is coupled to a second interrupt input of processor 200, such as an interrupt request (IRQ) signal. Data signal 254 may be coupled to an interrupt level input or be read through bus 204 as an interrupt vector or simply as data. One of ordinary skill in the art will appreciate that there are a variety of interrupt based approaches and corresponding designs and that the present embodiment is illustrative of one such approach.

Figure 11:
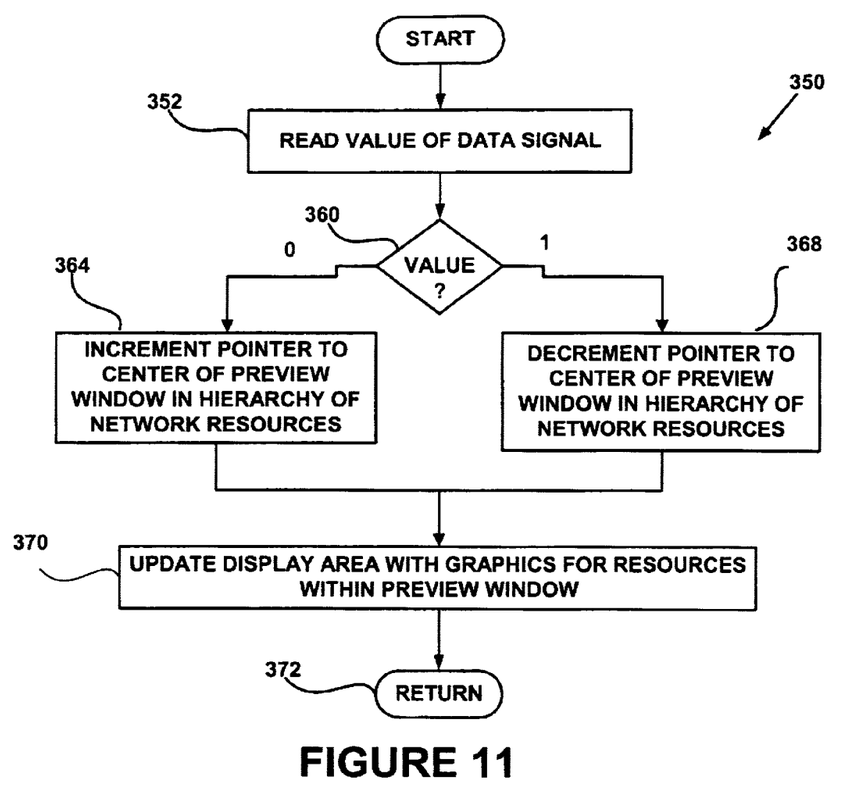
FIG. 11 is a control flow diagram that illustrates one embodiment of an interrupt routine, according to the present invention, for detecting changes in the rotational position of the knob of FIG. 10.

FIG. 11 is a control flow diagram illustrating one embodiment of an interrupt routine 350 for processing an interrupt caused by clock signal 252. Interrupt routine 350 is entered when clock signal 252 transitions to an active state, e.g. a rising edge of clock signal 252. At step 352, the value of data signal 254 is read. As noted above, data signal 254 may be input to processor 200 in various ways, including using a buffer, such as flip-flop 208 and the attendant addressing circuitry shown in FIG. 9.

If the value of data signal 254 is a logic zero, then control flow branches at step 360 to step 364, where the pointer to the center of the preview window in the hierarchy of network resources is incremented. If the value of data signal 254 is a logic one, then control flow branches at step 360 to step 368, where the pointer is decremented. In either case, control flow subsequently proceeds to step 370, where the preview area 150 is updated with graphics for the network resources within the preview window. Once this processing is completed, interrupt routine 350 returns at step 372.

Figure 12:
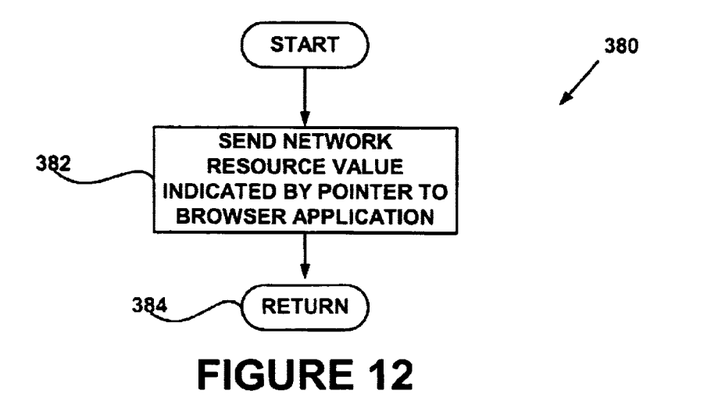
FIG. 12 is a control flow diagram that illustrates one embodiment of an interrupt routine, according to the present invention, for handling user selection inputs of the knob of FIG. 10.

FIG. 12 is a control flow diagram illustrating one embodiment of an interrupt routine 380 for processing an interrupt caused by selection signal 256. Interrupt routine 380 is entered when selection signal 256 transitions to an active state, e.g. a rising edge of selection signal 256. At this point, any rotation of knob 122 has been handled by interrupt routine 350 of FIG. 11. As a result, interrupt routine 380 only needs to process the selected network resource, which is pointed to by the current position of the pointer to the center of the preview window. Therefore, at step 382, the network resource value, e.g. URL value, indicated by the point is sent to browser application 202 for further processing. The interrupt routine then returns at step 384.

As can be seen in FIGS. 10, 11 and 12, the use of an interrupt driven approach can simplify or eliminate some of the hardware circuitry and software required for processing user input via knob 122 and is a viable option where processor usage permits the interrupts to be processed without adversely affecting other processes executing on the processor.

The present invention provides a way to select network resources accessible through a wide area network, such as web pages, that is simple and intuitive to use, even by a user with limited computer skills. The present invention can also provide a large number of available selections for network resources by using an incremental rotary encoder as the user selection knob, which provides for a virtual relationship between knob position rather than an absolute relationship.

In view of the wide variety of embodiments to which the principles of the invention can be applied, it should be understood that the illustrated embodiment is exemplary only, and should not be taken as limiting the scope of the present invention. For example, one of ordinary skill in the art will readily appreciate that various elements of the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A client system for accessing wide area network resources, the client system comprising:

a display having a viewing area and a previewing area, where the previewing area includes a selection frame;

a user selection knob configured to generate a clock signal and a data signal, where the clock signal indicates that the knob is being rotated and the data signal indicates a direction of rotation of the knob;

a selection switch configured to generate a selection signal;

a memory subsystem configured to store a predetermined hierarchy of network resources, where the hierarchy of network resources includes a plurality of network resource identifier pairs, where each one of the plurality of network resource identifier pairs further includes a network resource identifier value corresponding to a network resource accessible via a wide area network and a graphic representing the network resource;

a network access circuit configured to communicate with the wide area network; and a processor system coupled to the display, the user selection knob, the selection switch, the memory subsystem, and the network access circuit, where the processor system is configured to receive and decode the clock signal and the data signal in order to control a data index that selectively indexes one of the plurality of network resource identifier pairs, where the processor system is further configured to display the graphic from the network resource identifier pair indicated by the data index in the selection frame of the display, and where the processor system is still further configured, responsive to receiving the selection signal, to format a command that includes the network resource identifier value of the network resource identifier pair indicated by the data index and transmit the command onto the wide area network via the network access circuit.

2. The client system of claim 1, wherein:

the previewing area of the display further includes a first previewing frame; and the processor system is further configured to display the graphic from a first adjacent network resource identifier pair that is adjacent to the network resource identifier pair indicated by the data index.

3. The client system of claim 1, where the selection switch is integrated with the user selection knob such that depressing the user selection knob generates the selection signal.

4. The client system of claim 1, where the processor system is further configured to receive a response to the command, process the response, and display information from the response in the viewing area of the display.

5. The client system of claim 4, where the processor system further includes a browser application that formats the command and processes the response.

6. The client system of claim 1, where the processor system further includes a user interface application for updating the network resource identifier pairs of the hierarchy.

7. The client system of claim 1, where the processor system further includes:

a timer circuit configured to generate a timer interrupt signal at a predetermined time interval;

a knob interface circuit configured to receive the clock signal and the data signal from the user selection knob and, responsive thereto, maintain a count value corresponding to the rotational motion of the user selection knob; and where the processor system is further configured to receive the timer interrupt signal and, responsive thereto, read the count value from the knob interface circuit and adjust the data index accordingly.

8. The client system of claim 7, where the processor system is further configured to read a state of the selection signal responsive to the timer interrupt signal.

9. The client system of claim 1, where the processor system is further configured to be interrupted by the clock signal and, responsive thereto, adjust the data index based on the value of the data signal.

10. The client system of claim 1, where the processor system is further configured to be interrupted by the selection signal and, responsive thereto, format and transmit the command that includes the network resource identifier value of the network resource identifier pair indicated by the data index.

11. The client system of claim 1, where the user selection knob further comprises an incremental rotary encoder device.

12. The client system of claim 1, where each network resource identifier value is one of a Uniform Resource Locator (URL) value or a Uniform Resource Identifier (URI) value.

13. A method for selecting network resources on a wide area network, the method comprising the steps of:
  storing a hierarchy of the network resources accessible via the wide area network, the hierarchy of network resources including a plurality of network resource identifier pairs, where each one of the plurality of network resource identifier pairs further includes a network resource identifier value corresponding to a network resource accessible via the wide area network and a graphic representing the network resource;
  rotating a user selection knob to control a data index to the hierarchy of network resources, where the data index indicates one of the plurality of network resource identifier pairs;
  displaying in a selection frame the graphic from the network resource identifier pair indicated by the data index;
  selecting the network resource indicated by the data index; and
  accessing the selected network resource using the network resource identifier value from the network resource identifier pair indicated by the data index.

14. The method of claim 13, where the step of rotating a user selection knob to control a data index to the hierarchy of network resources further comprises the steps of:
  ascending the hierarchy of network resources with the data index when the user selection knob is rotated in a first direction; and
  descending the hierarchy of network resources with the data index when the user selection knob is rotated in a second direction.

15. The method of claim 13, where the step of rotating a user selection knob to control a data index to the hierarchy of network resources includes:
  maintaining a count value corresponding to rotational movement of the user selection knob;
  periodically checking the count value; and
  adjusting the data index according to periodic change in the count value.

16. The method of claim 13, where the step of rotating a user selection knob to control the data index to the hierarchy of network resources includes:
  sensing a transition in a clock signal caused by rotation of the user selection knob;
  responsive to the transition in the clock signal, sensing a value of a data signal that indicates a direction of rotation of the user selection knob;
  incrementing the data index to a next network resource value pair in the hierarchy of network resources responsive to a first value of the data signal; and
  decrementing the data index to a preceding network resource value pair in the hierarchy of network resources with the data index responsive to a second value of the data signal.

17. The method of claim 13, where the step of selecting the network resource indicated by the data index includes depressing the user selection knob.

18. The method of claim 13, where the step of selecting the network resource indicated by the data index includes depressing a user input button.

19. The method of claim 13, where the method includes a step of displaying in a preview frame the graphic from an adjacent network resource identifier pair that is adjacent in the hierarchy to the network resource identifier pair indicated by the data index.

20. The method of claim 13, where the step of accessing the selected network resource using the network resource identifier value from the network resource identifier pair indicated by the data index further comprises the steps of:
  formatting a command that includes the network resource identifier value from the network resource identifier pair indicated by the data index;
  transmitting the command onto the network;
  receiving a response to the command from the network; and
  processing and displaying information from the response.

21. The method of claim 13, where:
  the step of selecting the network resource indicated by the data index includes sending the network resource identifier value from the network resource identifier pair indicated by the data index to a browser application; and
  the step of accessing the selected network resource using the network resource identifier value from the network resource identifier pair indicated by the data index includes the steps of:
  formatting an HTTP command in the browser that includes the network resource identifier value from the network resource identifier pair indicated by the data index,
  transmitting the HTTP command onto the network,
  receiving an HTTP response that includes HTML information,
  processing the HTML information in the browser application to form a web page, and
  displaying the web page.

22. The method of claim 13, the method further including a step of adding a new network resource identifier pair to the hierarchy of network resources.

23. A computer readable medium that includes computer readable instructions for executing the steps of claim 13.

24. A method for selection of input to a browser application, the method comprising the steps of:
  providing a hierarchy of network resources, each network resource having a network resource identifier value and a graphic;
  rotating a knob to control a subset of network resources within a preview window from the hierarchy of network resources;
  providing a preview area on a display;
  displaying the graphics corresponding to the network resources within the preview window;
  selecting a graphic displayed with the preview area; and
  inputting the network resource identifier value corresponding to the selected graphic to the browser application.

25. The method of claim 24, where the step of displaying the graphics corresponding to the network resources within the preview window further comprises scrolling the graphics corresponding to the network resources within the preview window through the preview area responsive to rotation of the knob.

26. The method of claim 24, where the network resources are accessible via a wide area network.

27. The method of claim 26, where the network resource identifier values further comprise URL values.

28. The method of claim 24, the method further including the steps of: processing the network resource identifier value input to the browser application; and displaying an output of the browser application in a viewing area of the display.

* * * * *